US009080666B2

(12) United States Patent
Berger et al.

(10) Patent No.: US 9,080,666 B2
(45) Date of Patent: Jul. 14, 2015

(54) DISCRETE MECHANISM FOR ELECTRONIC TRANSMISSION RANGE SELECTION

(71) Applicant: GM Global Technology Operations LLC, Detroit, MI (US)

(72) Inventors: Todd R. Berger, Pinckney, MI (US); Peter Donald Bock, Commerce Township, MI (US); John R. Czoykowski, Grosse Pointe Park, MI (US); Christopher J. Landino, Sterling Heights, MI (US); Bradford E. Vorbeck, Ypsilanti, MI (US); Stephen W. Powell, South Lyon, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 51 days.

(21) Appl. No.: 13/893,880

(22) Filed: May 14, 2013

(65) Prior Publication Data

US 2013/0319156 A1    Dec. 5, 2013

Related U.S. Application Data

(60) Provisional application No. 61/652,803, filed on May 29, 2012.

(51) Int. Cl.
 *F16H 59/08* (2006.01)
 *F16H 61/00* (2006.01)
 (Continued)

(52) U.S. Cl.
 CPC ............ *F16H 59/08* (2013.01); *F16H 61/0021* (2013.01); *F16H 63/483* (2013.01); *F16H 61/0206* (2013.01); *Y10T 74/20024* (2015.01)

(58) Field of Classification Search
 USPC ......................... 477/190, 191, 196; 192/219.4
 See application file for complete search history.

(56) References Cited

U.S. PATENT DOCUMENTS 2,782,657 A * 2/1957 Lucia .............................. 477/64
2,910,942 A   11/1959 Thorman
(Continued)

FOREIGN PATENT DOCUMENTS

DE           2141564 A1    2/1973
DE           4117736 C1    5/1992
(Continued)

OTHER PUBLICATIONS

Pending U.S. Appl. No. 13/670,948, filed Nov. 7, 2012 by Landino et al. All pages.

*Primary Examiner* — Justin Holmes
*Assistant Examiner* — David Morris

(57) ABSTRACT

A hydraulic control system for a transmission is provided. The hydraulic control system includes a source of pressurized hydraulic fluid that communicates with a discrete electronic transmission range selection (ETRS) subsystem. The hydraulic control system includes first and second mode valves located downstream of a hydraulic fluid pressure source. The mode valves are supplied with fluid via one or more solenoid valves or other valves. The mode valves have a plurality of ports configured to transfer pressurized hydraulic fluid. The first mode valve transfers pressurized hydraulic fluid from the source to the second mode valve. The second mode valve transfers pressurized hydraulic fluid from the first mode valve to one of drive or reverse. An electro-hydraulic circuit for pulling the transmission out of park and putting the transmission into park is also provided. A park sensor assembly including a Hall Effect sensor switch is also provided.

8 Claims, 15 Drawing Sheets

(51) Int. Cl.
*F16H 63/48* (2006.01)
*F16H 61/02* (2006.01)

(56) References Cited

U.S. PATENT DOCUMENTS

| | | | |
|---|---|---|---|
| 3,107,621 A | 10/1963 | Szady et al. | |
| 3,164,034 A | 1/1965 | Kelley | |
| 3,840,088 A | 10/1974 | Marumo et al. | |
| 3,912,050 A | 10/1975 | Iwanaga et al. | |
| 4,347,044 A | 8/1982 | Ahlen et al. | |
| 4,351,206 A * | 9/1982 | Lemieux et al. | 477/134 |
| 4,369,867 A | 1/1983 | Lemieux | |
| 4,519,273 A * | 5/1985 | Shimizu et al. | 180/273 |
| 4,653,352 A | 3/1987 | Nakao et al. | |
| 4,704,917 A | 11/1987 | Hiroyasu | |
| 4,944,202 A | 7/1990 | Gierer | |
| 5,078,242 A | 1/1992 | Ratke et al. | |
| 5,179,868 A | 1/1993 | Thibeault | |
| 5,191,178 A | 3/1993 | Baker | |
| 5,203,235 A | 4/1993 | Iizuka | |
| 5,220,985 A | 6/1993 | Annis et al. | |
| 5,299,470 A | 4/1994 | Snell et al. | |
| 5,370,015 A | 12/1994 | Moscatelli | |
| 5,386,742 A | 2/1995 | Irikura et al. | |
| 5,433,124 A | 7/1995 | Person | |
| 5,441,459 A | 8/1995 | Inukai et al. | |
| 5,492,509 A | 2/1996 | Goates | |
| 5,507,706 A | 4/1996 | Jang et al. | |
| 5,582,559 A | 12/1996 | Jang et al. | |
| 5,626,533 A | 5/1997 | Jang | |
| 5,733,221 A | 3/1998 | Jang | |
| 5,736,701 A | 4/1998 | O'Brien et al. | |
| 5,768,944 A | 6/1998 | Inuzuka et al. | |
| 5,791,197 A | 8/1998 | Rempinski et al. | |
| 5,813,941 A | 9/1998 | Jang | |
| 5,876,303 A | 3/1999 | Yu | |
| 5,887,483 A * | 3/1999 | Ohashi et al. | 74/336 R |
| 5,899,115 A | 5/1999 | Kataumi et al. | |
| 5,919,108 A | 7/1999 | Takagi | |
| 5,921,888 A | 7/1999 | Park | |
| 6,027,427 A | 2/2000 | Yoo | |
| 6,148,686 A | 11/2000 | Kataumi | |
| 6,205,880 B1 | 3/2001 | Deidewig et al. | |
| 6,308,797 B1 | 10/2001 | Hacker et al. | |
| 6,481,556 B1 | 11/2002 | Haupt | |
| 6,537,180 B2 | 3/2003 | Kim et al. | |
| 6,698,555 B2 | 3/2004 | Schafer et al. | |
| 6,701,797 B2 | 3/2004 | Heuver | |
| 6,715,597 B1 | 4/2004 | Buchanan et al. | |
| 6,942,591 B2 | 9/2005 | Park | |
| 6,983,668 B2 | 1/2006 | Powell et al. | |
| 7,270,027 B2 | 9/2007 | Berger et al. | |
| 7,300,375 B2 | 11/2007 | Petrzik | |
| 7,396,306 B2 * | 7/2008 | Long et al. | 475/127 |
| 7,487,866 B2 | 2/2009 | Kruse et al. | |
| 7,654,935 B2 | 2/2010 | Tanaka et al. | |
| 7,896,775 B2 | 3/2011 | Vernacchia et al. | |
| 8,053,691 B2 | 11/2011 | Vernacchia et al. | |
| 8,403,793 B2 | 3/2013 | Moorman et al. | |
| 2001/0036878 A1 | 11/2001 | Itou et al. | |
| 2002/0060113 A1 | 5/2002 | Harries | |
| 2002/0086759 A1 | 7/2002 | Imai et al. | |
| 2002/0119864 A1 | 8/2002 | Harries | |
| 2003/0075408 A1 | 4/2003 | Alfredsson | |
| 2004/0011609 A1 | 1/2004 | Schmid | |
| 2004/0038765 A1 | 2/2004 | Fujimine et al. | |
| 2005/0003921 A1 | 1/2005 | Morise et al. | |
| 2007/0175726 A1 | 8/2007 | Combes et al. | |
| 2008/0207392 A1 | 8/2008 | Staudinger | |
| 2008/0210032 A1 | 9/2008 | Uberti et al. | |
| 2008/0216908 A1 | 9/2008 | Vernacchia et al. | |
| 2008/0220923 A1 | 9/2008 | Whitmarsh et al. | |
| 2009/0082153 A1 | 3/2009 | Fujikawa et al. | |
| 2009/0151495 A1 | 6/2009 | Garabello et al. | |
| 2009/0157271 A1 | 6/2009 | Garabello et al. | |
| 2012/0175210 A1 | 7/2012 | Moorman | |

FOREIGN PATENT DOCUMENTS

| | | | |
|---|---|---|---|
| DE | 4208888 A1 * | 9/1993 | |
| DE | 4320353 A1 | 1/1994 | |
| DE | 29714652 U1 | 10/1997 | |
| DE | 19921301 A1 | 11/1999 | |
| DE | 19849488 A1 | 5/2000 | |
| DE | 19931973 A1 | 1/2001 | |
| DE | 10134115 A1 | 1/2003 | |
| DE | 10242382 A1 | 4/2004 | |
| DE | 102005029963 A1 | 2/2007 | |
| DE | 102005029964 A1 | 3/2007 | |
| EP | 0477564 A2 | 4/1992 | |
| EP | 1469235 A1 | 10/2004 | |
| EP | 1519082 A1 | 3/2005 | |
| EP | 1645786 A2 | 4/2006 | |
| EP | 2151586 A2 | 2/2010 | |
| FR | 2808065 A1 | 10/2001 | |
| JP | 58102851 A | 6/1983 | |
| JP | 61253224 A | 11/1986 | |
| JP | 01199035 A | 8/1989 | |
| JP | 2007010145 A | 1/2007 | |
| WO | WO9705410 A1 | 2/1997 | |
| WO | WO9919644 A1 | 4/1999 | |
| WO | WO2009037170 A1 | 3/2009 | |
| WO | WO2010028745 A2 | 3/2010 | |

* cited by examiner

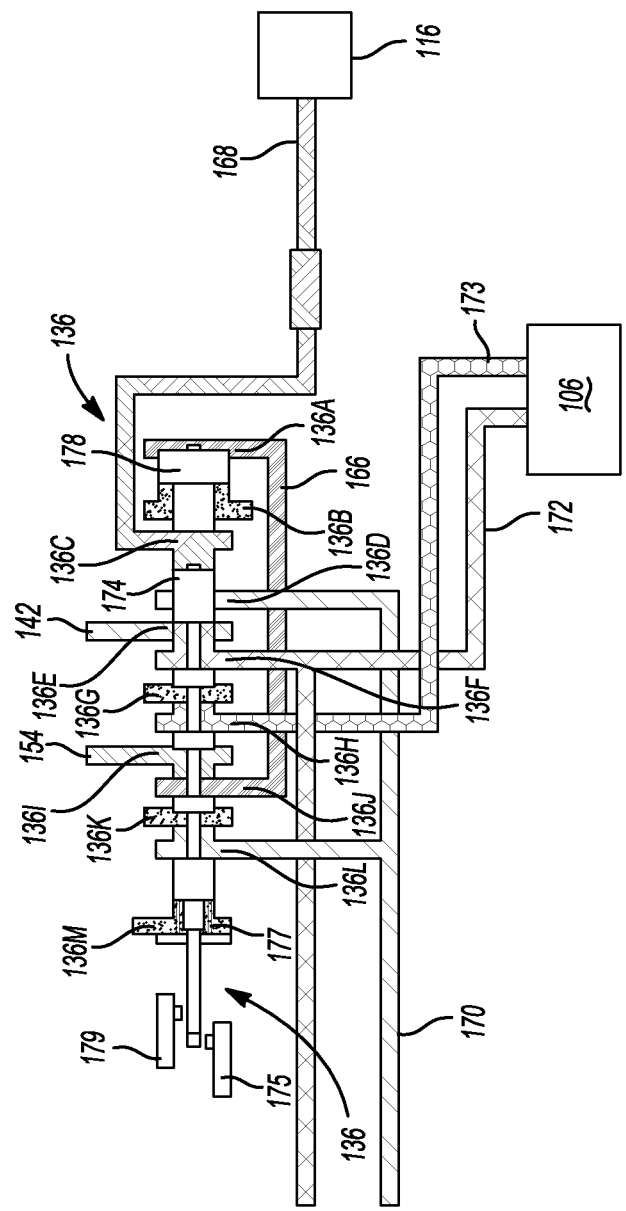
Fig-1Bii

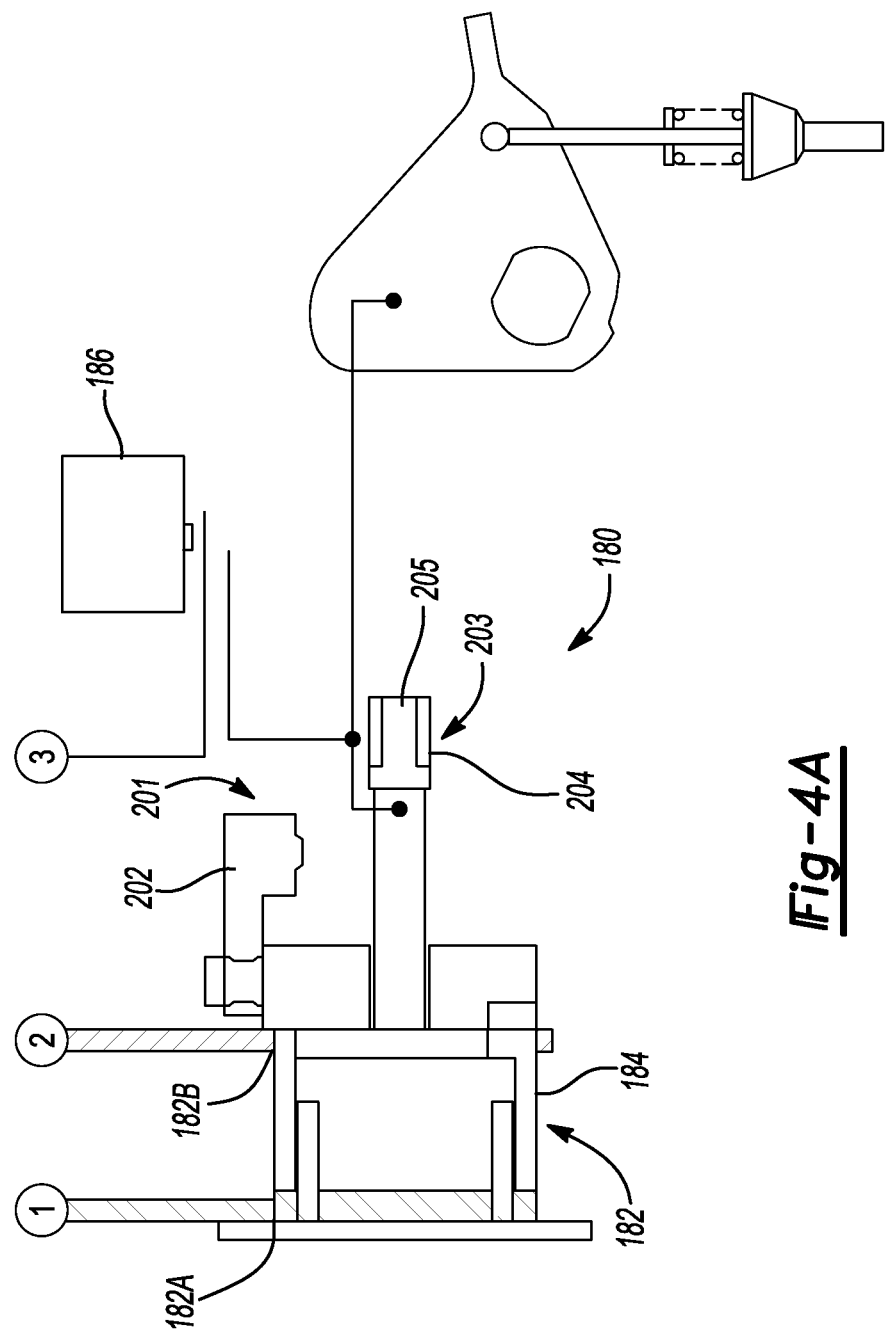

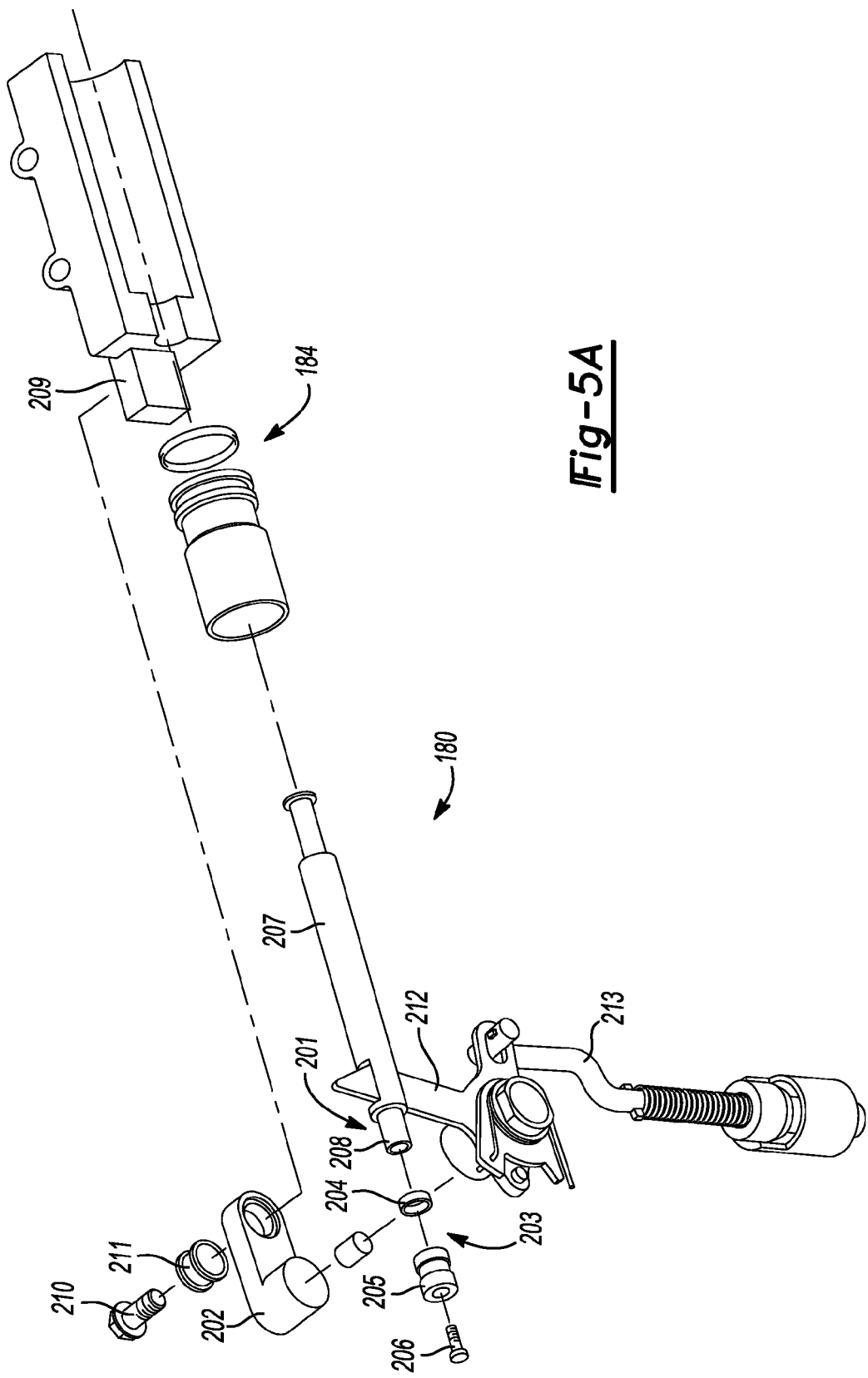

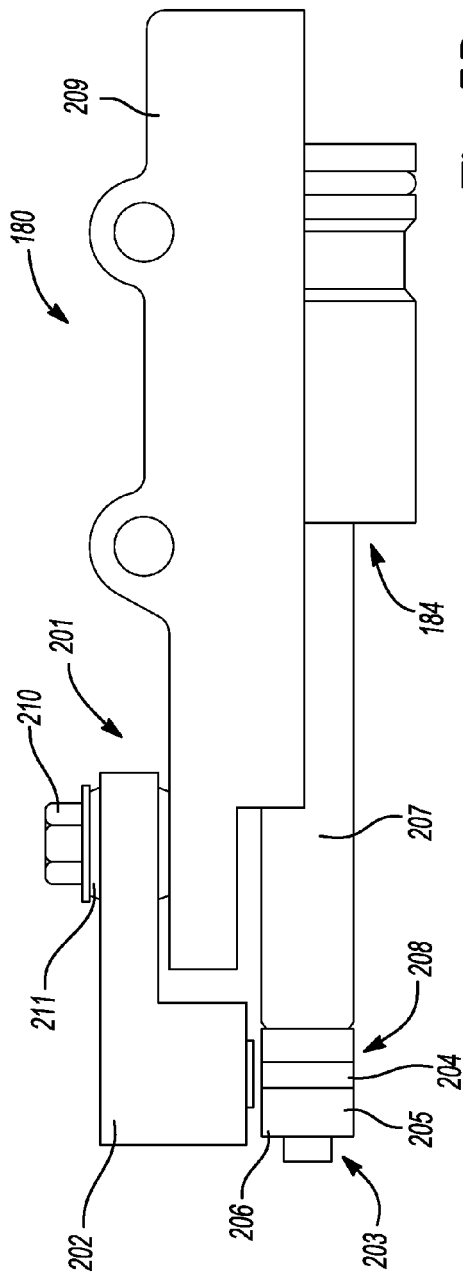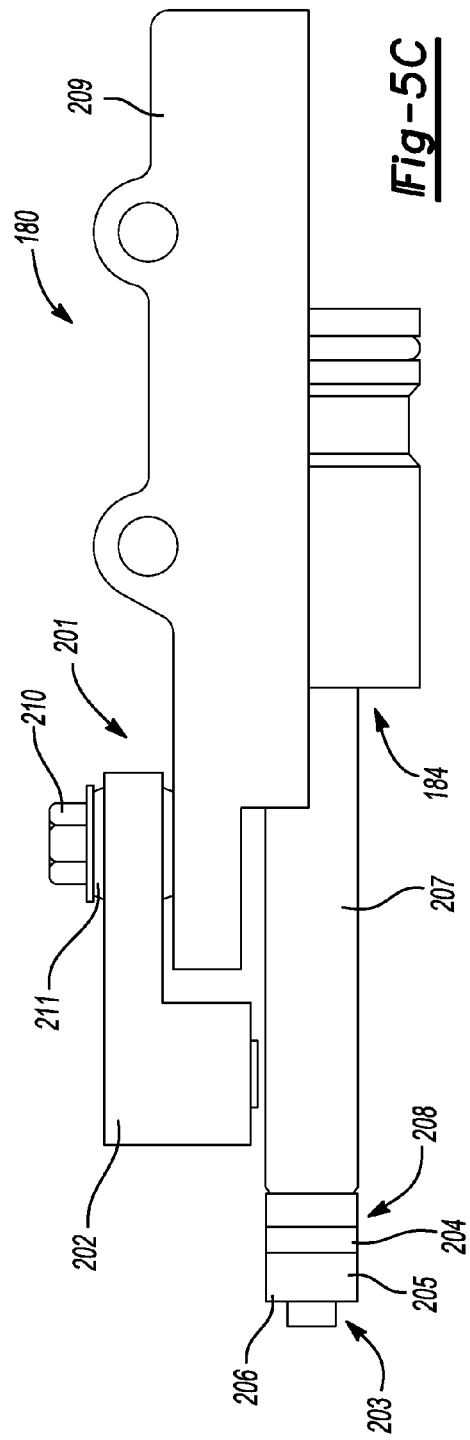

DISCRETE MECHANISM FOR ELECTRONIC TRANSMISSION RANGE SELECTION

CROSS-REFERENCE TO RELATED APPLICATIONS

This application claims the benefit of U.S. Provisional Application No. 61/652,803 filed on May 29, 2012. The disclosure of the above application is incorporated herein by reference.

TECHNICAL FIELD

The invention relates to a control system for an automatic transmission, and more particularly to an electro-hydraulic control system having a mechanism for electronic transmission range selection.

BACKGROUND

A typical multi-speed transmission uses several torque transmitting devices, such as friction clutches, to achieve a plurality of forward and reverse gear or speed ratios, a Neutral, and a Park. Selection of speed ratios is typically accomplished by engaging a shift lever or other driver interface device that is connected by a shifting cable or other mechanical connection to the transmission. Alternatively, the selection of speed ratios may be controlled by an electronic transmission range selection (ETRS) system, also known as a "shift by wire" system. In an ETRS system, selection of speed ratios is accomplished through electronic signals communicated between the driver interface device and the transmission. The ETRS system reduces mechanical components, increases instrument panel space, enhances styling options, and eliminates the possibility of shifter cable misalignment with the transmission range selection levers.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a hydraulically actuated automatic transmission.

SUMMARY

A hydraulic control system for a transmission is provided. The hydraulic control system includes a source of pressurized hydraulic fluid that communicates with a discrete electronic transmission range selection (ETRS) subsystem.

The hydraulic control system includes first and second mode valves located downstream of a hydraulic fluid pressure source. The mode valves are supplied with fluid via one or more solenoid valves or other valves. The mode valves have a plurality of ports configured to transfer pressurized hydraulic fluid. The first mode valve transfers pressurized hydraulic fluid from the source to the second mode valve. The second mode valve transfers pressurized hydraulic fluid from the first mode valve to one of drive or reverse. An electro-hydraulic circuit for pulling the transmission out of park and putting the transmission into park is also provided.

In one aspect, which may be combined with or separate from the other aspects described herein, a hydraulic control system for a transmission is provided, wherein the transmission has a Park mode and an Out of Park mode of operation, and the transmission has a plurality of torque transmitting devices selectively engageable to provide at least one forward speed ratio and at least one reverse speed ratio when in the Out of Park mode of operation. The hydraulic control system includes a pressure regulator subsystem for providing a pressurized hydraulic fluid and a clutch control subsystem for selectively actuating the torque transmitting devices upon receipt of the pressurized hydraulic fluid. A first mode valve assembly is disposed in downstream fluid communication with the pressure regulator subsystem and in upstream fluid communication with the clutch control subsystem. A second mode valve assembly is disposed in downstream fluid communication with the first mode valve assembly and the pressure regulator subsystem and in upstream fluid communication with the clutch control subsystem. A park feed valve assembly is disposed in downstream fluid communication with the pressure regulator subsystem and the first mode valve assembly. The park feed valve assembly has a park feed valve moveable between a Park position and an Out of Park position. A park mechanism is disposed in downstream fluid communication with the park feed valve assembly and the first and second mode valve assemblies. The park mechanism is configured to place the transmission in a Park condition and an Out of Park condition. A park lock control device is connected to the park mechanism, and the park lock control device is actuatable to mechanically prevent the park mechanism from placing the transmission in a Park condition during an engine stop-start event.

In another aspect, which may be combined with or separate from the other aspects described herein, a hydraulic control system for a transmission is provided, wherein the transmission has a Park mode and an Out of Park mode of operation, and the transmission has a plurality of torque transmitting devices selectively engageable to provide at least one forward speed ratio and at least one reverse speed ratio when in the Out of Park mode of operation. The hydraulic control system includes a pressure regulator subsystem for providing a pressurized hydraulic fluid. A first mode valve assembly has first, second, third and fourth ports, the first and second ports being in communication with the pressure regulator subsystem. The first mode valve assembly has a first mode valve moveable between a first and a second position. A second mode valve assembly has a first port in communication with the third port of the first mode valve assembly and a second port in communication with the fourth port of the first mode valve assembly. The second mode valve assembly has a third port in communication with a Drive circuit, a fourth port in communication with a Reverse circuit, and a fifth port. The second mode valve assembly has a second mode valve moveable between a first and a second position. A park feed valve assembly has a first port in communication with the third port of the first mode valve assembly and a second port in communication with a Park circuit. The park feed valve assembly has a park feed valve moveable between a Park position and an Out of Park position. A park mechanism has a first port in communication with the second port of the park feed valve assembly and a second port in communication with the fifth port of the second mode valve assembly. The park mechanism is configured to place the transmission in a Park condition and an Out of Park condition.

In yet another aspect, which may be combined with or separate from the other aspects described herein, a park sensor assembly for a park mechanism of a vehicular transmission is provided. The park sensor assembly includes an actuator rod assembly configured to move the transmission into and out of park. A piston rod is connected to the actuator rod assembly through a park lever and is configured to move along an axis between a first position and a second position.

One of the first and second positions corresponds to a Park position of the transmission and the other of the first and second positions corresponds to an Out of Park position of the transmission. A magnet assembly is fixed to the piston rod. A Hall Effect sensor switch is disposed adjacent to the magnet assembly. The magnet assembly and piston rod are movable with respect to the Hall Effect sensor switch. The Hall Effect sensor switch is operable to detect the magnet assembly when the piston rod is in the first position.

Further objects, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

FIG. 1Bii is a diagram of a portion of the hydraulic control system of FIGS. 1A-1C, showing the second mode valve in a stroked position, according to the principles of the present disclosure;

FIG. 4A is a diagram of a portion of still another hydraulic control system according to the principles of the present disclosure;

FIG. 5A is an exploded perspective view of a park mechanism, in accordance with the principles of the present disclosure;

FIG. 5B is a plan view of the park mechanism of FIG. 5A in a first position, according to the principles of the present disclosure; and FIG. 5C is a plan view of the park mechanism of FIGS. 5A-5B in a second position, in accordance with the principles of the present invention.

DESCRIPTION

Figure 1A:
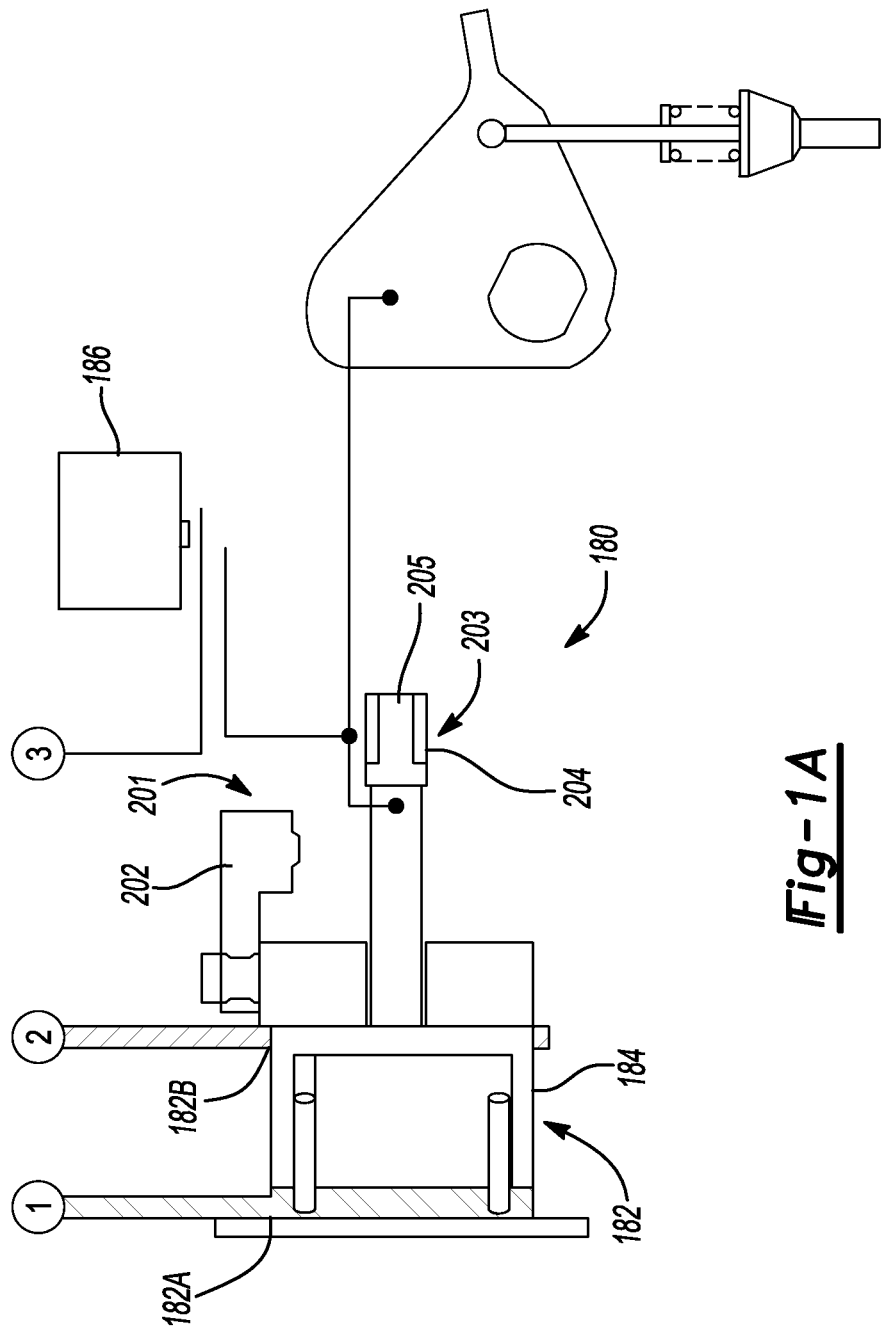
FIG. 1A is a diagram of a portion of a hydraulic control system according to the principles of the present disclosure.
Figure 1B:
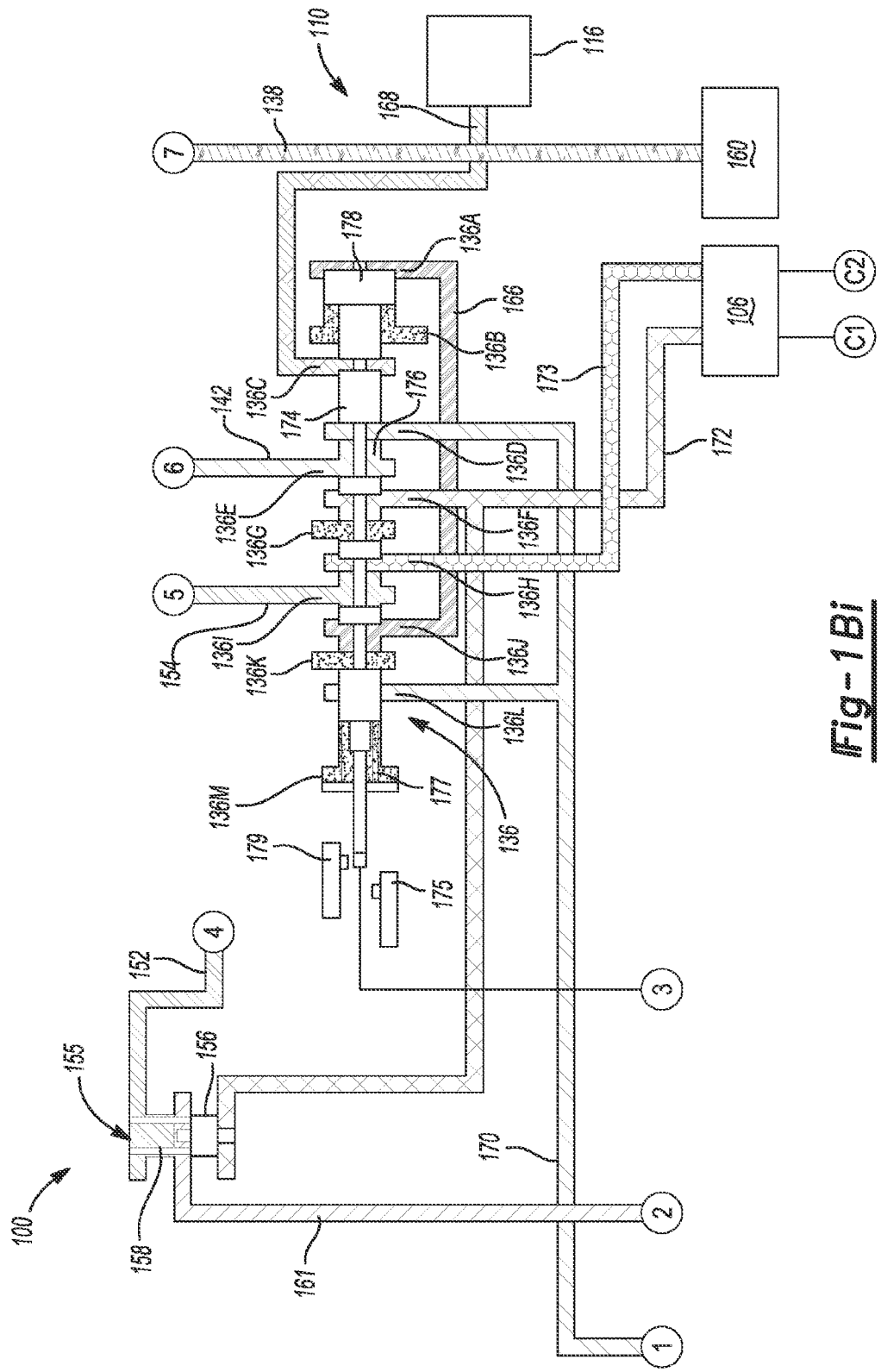
FIG. 1Bi is a diagram of another portion of the hydraulic control system of FIG. 1A, showing a second mode valve in a destroked position, in accordance with the principles of the present disclosure.
Figure 1C:
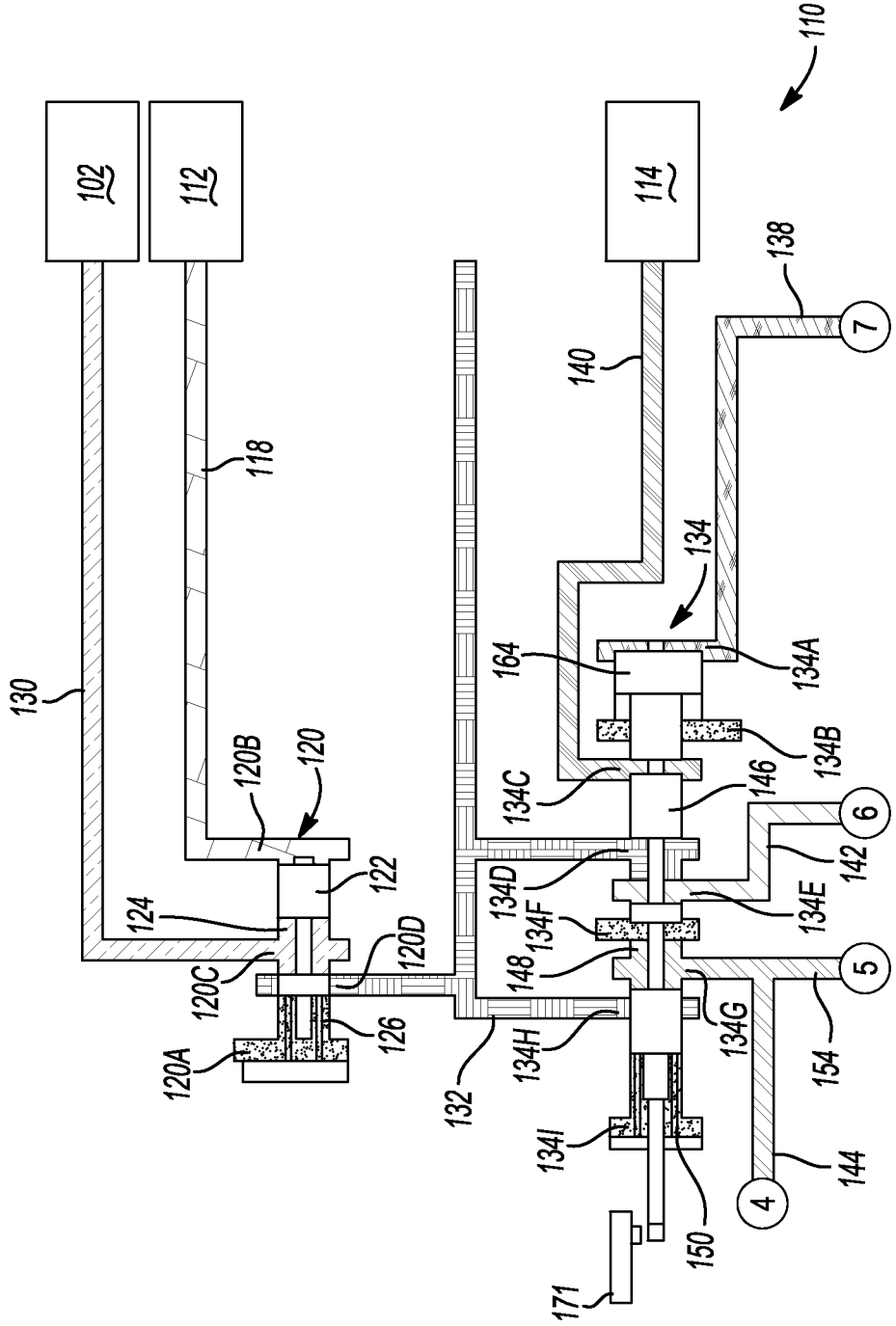
FIG. 1C is a diagram of yet another portion of the hydraulic control system of FIGS. 1A-1Bi, according to the principles of the present disclosure.

With reference to FIG. 1, a portion of a hydraulic control system according to the principles of the present invention is generally indicated by reference number 100. The hydraulic control system 100 generally includes a plurality of interconnected or hydraulically communicating subsystems including a pressure regulator subsystem 102, a clutch control subsystem 106, and an electronic transmission range selection (ETRS) control subsystem 110. The hydraulic control system 100 may also include various other subsystems or modules, such as a lubrication subsystem, a torque converter clutch subsystem, and/or a cooling subsystem, without departing from the scope of the present invention.

The pressure regulator subsystem 102 is operable to provide and regulate pressurized hydraulic fluid, such as oil, throughout the hydraulic control system 100. The pressure regulator subsystem draws hydraulic fluid from a sump, which may be disposed at the bottom of a transmission housing to which the hydraulic fluid returns and collects from various components and regions of the transmission. The hydraulic fluid is forced from the sump and throughout the hydraulic control system 100 via a pump. The pump is preferably driven by an engine and may be, for example, a gear pump, a vane pump, a gerotor pump, or any other positive displacement pump. The pump communicates pressurized hydraulic fluid to a fluid line. The fluid line may be in communication with a spring biased one-way valve, a spring biased blow-off safety valve, and a pressure regulator valve. The control system 100 may also include a feed limit valve assembly (not shown) to limit the maximum pressure of hydraulic fluid to various subsystems and control solenoids.

The clutch control subsystem 106 provides hydraulic fluid to clutch actuators (not shown). The clutch actuators are hydraulically actuated pistons that each engage one of a plurality of torque transmitting devices C1, C2 to achieve various forward, or drive speed ratios and reverse speed ratios.

The ETRS control subsystem 110 connects the pressure regulator subsystem 102 with the clutch control subsystem 106. Generally, the ETRS control subsystem 110 converts electronic input for a requested range selection (Drive, Reverse, Park) into hydraulic and mechanical commands. The hydraulic commands use line pressure hydraulic fluid from the pressure regulator subsystem 102 via fluid line 130 to supply hydraulic fluid to the clutch actuator subsystem. The mechanical commands include engaging and disengaging a park mechanism 180.

Referring to FIG. 1, the ETRS control subsystem 110 will now be described. The ETRS control subsystem 110 uses line pressure hydraulic fluid from the pump (or an auxiliary pump) to engage a range selection via the clutch control subsystem 106. The ETRS control subsystem 110 is controlled using the hydraulic fluid line pressure that originates with the pump (or an auxiliary pump), or another fluid source. The ETRS control subsystem 110 includes solenoids 112, 114, 116. Each of the solenoids 112, 114, 116 could be high flow, direct acting variable force solenoids, low flow on-off solenoids, or any other type of actuating device. In FIG. 1, at least one solenoid 116 is preferably a high flow, direct acting variable force solenoid. Each solenoid 112, 114, 116 may be supplied with hydraulic fluid from the pump (line pressure), or they may be fed hydraulic pressurized fluid from any other suitable fluid source.

The first solenoid 112 opens a fluid line 118 to supply pressurized hydraulic fluid to a first port 120B of an enablement valve assembly 120. The enablement valve assembly 120 includes a spool valve 122 slidably disposed within a bore 124 and four fluid ports 120A-D. When pressurized fluid is supplied through the fluid line 118, fluid pressure acts upon the spool valve 122 through the fluid port 120B and compresses the spool valve 122 against a spring 126 into a stroked position, by way of example. The spool valve 122 is actuated to a stroked position or by the solenoid 112 and by hydraulic fluid acting on the spool valve 122 delivered via fluid line 118 and to a de-stroked position by the spring 126. When the spool valve 122 of the enablement valve assembly 120 is actuated by the solenoid 112, the fluid port 120C communicates with the fluid port 120D. The fluid port 120C communicates with a fluid pressure source line 130, and the fluid port 120D communicates with a mode valve supply line 132. Accordingly, when the enablement valve assembly 120 is actuated by the solenoid 112, the fluid pressure source line 130, such as from line pressure, communicates with the mode valve supply line 132. Port 120A is an exhaust port that communicates with the sump.

The ETRS subsystem 110 further includes first and second mode valve assemblies 134, 136. The first mode valve 134 includes ports 134A-I. Port 134A communicates with a fluid line 138. Port 134C communicates with a fluid line 140. Ports 134D and 134H communicate with the fluid line 132. Port 134E communicates with a fluid line 142. Port 134G communicates with a fluid line 144. Port 134B, 134F, and 134I are exhaust ports that communicate with the sump.

The first mode valve assembly 134 further includes a valve 146 slidably disposed within a bore 148. The valve 146 is actuated by the solenoid 114 and a spring 150. When solenoid 114 is opened, fluid communicates through solenoid 114, through line 140, and moves the valve 146 against the spring 150. Accordingly, the valve 146 is moveable between a stroked position where the spring 150 is compressed and a de-stroked position, shown in FIG. 1. In the de-stroked position, as illustrated in FIG. 1, port 134D communicates with port 134E. Accordingly, the mode valve supply line 132 communicates with line 142. From there, fluid travels to port 136E of the second mode valve assembly 136, which will be described in further detail below. When the first mode valve assembly 134 is de-stroked, port 134H is closed.

In the stroked position, solenoid 114 is opened and fluid from line 140 contacts the valve 146 through port 134C and moves the valve 146 against the spring 150. In this condition, port 134H communicates with port 134G, and port 134D is closed. Accordingly, when actuated, line 132 communicates with line 144. One branch 152 of line 144 communicates with a park feed valve assembly 155, and another branch 154 of line 144 communicates with port 136I of the second mode valve assembly 136.

In some variations, the solenoid 114 is used for other purposes within the transmission. In such a case, the solenoid 114 may not be available to actuate or to hold open the first mode valve assembly 134. In such a case, another solenoid or valve 160 may be used to feed fluid via the fluid line 138 to the first port 134A of the first mode valve assembly 134. Fluid pressure within the line 162 compresses a second valve 164 located within the bore 148 of the first mode valve assembly 134. When the second valve 164 is compressed, the valve 146 is held in the actuated position and fluidly connecting the ports 134H and 134G.

The valve 174 is moveable between a stroked position where the spring 177 is compressed (shown in FIG. 1Bi), and a de-stroked position where the spring 177 is not compressed (shown in FIG. 1Bii). In the de-stroked position, port 136I communicates with port 136H and port 136E is blocked. Accordingly, branch 154 of line 144 communicates with line 173, which is the drive line of the transmission. Therefore, the transmission is in "Drive" when the second mode valve assembly 136 is de-stroked, subject to the Park status. In the de-stroked position, port 136F communicates with port 136G and exhausts. In addition, port 136E communicates with port 136D. Accordingly, line 142 communicates with the "into park" line 170, therefore sending fluid to the park mechanism 180, which will be described in further detail below.

The second mode valve assembly 136 generally includes ports 136A-M. Ports 136B, 136G, 136K, and 136M are exhaust ports that communicate with the sump. Ports 136A and 136J communicate with a fluid line 166. Port 136C communicates with fluid line 168. Ports 136D and 136L communicate with a fluid line 170. Port 136E communicates with the fluid line 142. Port 136F communicates with a fluid line 172. Port 136H communicates with a fluid line 173. Port 136I communicates with the branch 154 of the fluid line 144. The second mode valve assembly 136 includes a valve 174 slidably disposed within a bore 176. The valve 174 is actuated by the solenoid 116. When solenoid 116 is opened, fluid travels through line 168, communicates through port 136C, and moves the valve 174 against the spring 177.

The valve 174 is moveable between a stroked position where the spring 177 is compressed (shown in FIG. 1A), and a de-stroked position where the spring 177 is not compressed (shown in FIG. 1). In the de-stroked position, port 136I communicates with port 136H and port 136E is blocked. Accordingly, branch 154 of line 144 communicates with line 173, which is the drive line of the transmission. Therefore, the transmission is in "Drive" when the second mode valve assembly 136 is de-stroked, subject to the Park status. In the de-stroked position, port 136F communicates with port 136G and exhausts. In addition, port 136E communicates with port 136D. Accordingly, line 142 communicates with the "into park" line 170, therefore sending fluid to the park mechanism 180, which will be described in further detail below.

In the stroked position (see FIG. 1A), wherein the valve 174 is compressed against the spring 177, the port 136L communicates with the port 136K and exhausts. The port 136I communicates with the port 136J. Accordingly, the branch 154 of the line 144 (FIG. 1) communicates with the line 166. Pressure in line 166 acts upon a second valve 178 in the bore 176 and forces the second valve 178 toward the first valve 174, thereby closing the port 136C. In addition, in the stroked position, port 136H communicates with port 136G and exhausts. Also, port 136E communicates with port 136F. Accordingly, line 142 communicates with line 172, which is the "Reverse" line. Therefore, the transmission is in "Reverse" when the second mode valve assembly 136 is stroked, subject to the Park status.

The first mode valve assembly 134 may include a position sensor 171, and the second mode valve assembly 136 may include a pair of position sensors 175, 179, by way of example.

As described above, the park feed valve assembly 155 feeds fluid pressure to the "out of park" line 161, and the port 136D feed fluid pressure into the "into park" line 170. Fluid lines 161 and 170 communicate with the Park servo valve 182. The Park servo valve 182 includes ports 182A and 182B each located on either side of a piston 184. The piston 184 is mechanically coupled to the park mechanism 180. Port 182A communicates with fluid line 170 and port 182B communicates with fluid line 161. The piston 184 moves upon contact by the hydraulic fluid supplied by one of the fluid lines 161, 170, thereby mechanically disengaging or engaging the Park mechanism 180.

The Park mechanism 180 is connected with an out-of-Park (OOP) solenoid 186. The OOP solenoid 186 is actuatable to mechanically prevent the valve 174 from stroking and to prevent the Park mechanism 180 from engaging during an engine stop-start event (i.e. when the vehicle is intended to be mobile during an automatic engine stop). The OOP solenoid 186 may also be used to disengage the Park servo valve 182 when it is desirable to operate in Drive or Reverse at other times.

A park sensor assembly 201 is used to identify whether the park mechanism 180 is in park. The park sensory assembly 201 includes a Hall Effect sensor switch 202 and a magnet assembly 203, which includes a magnet 204, a holder 205, and a fastener 206 (see FIG. 5A). The park sensor assembly is described in additional detail in FIGS. 5A-5C below.

Figure 2A:
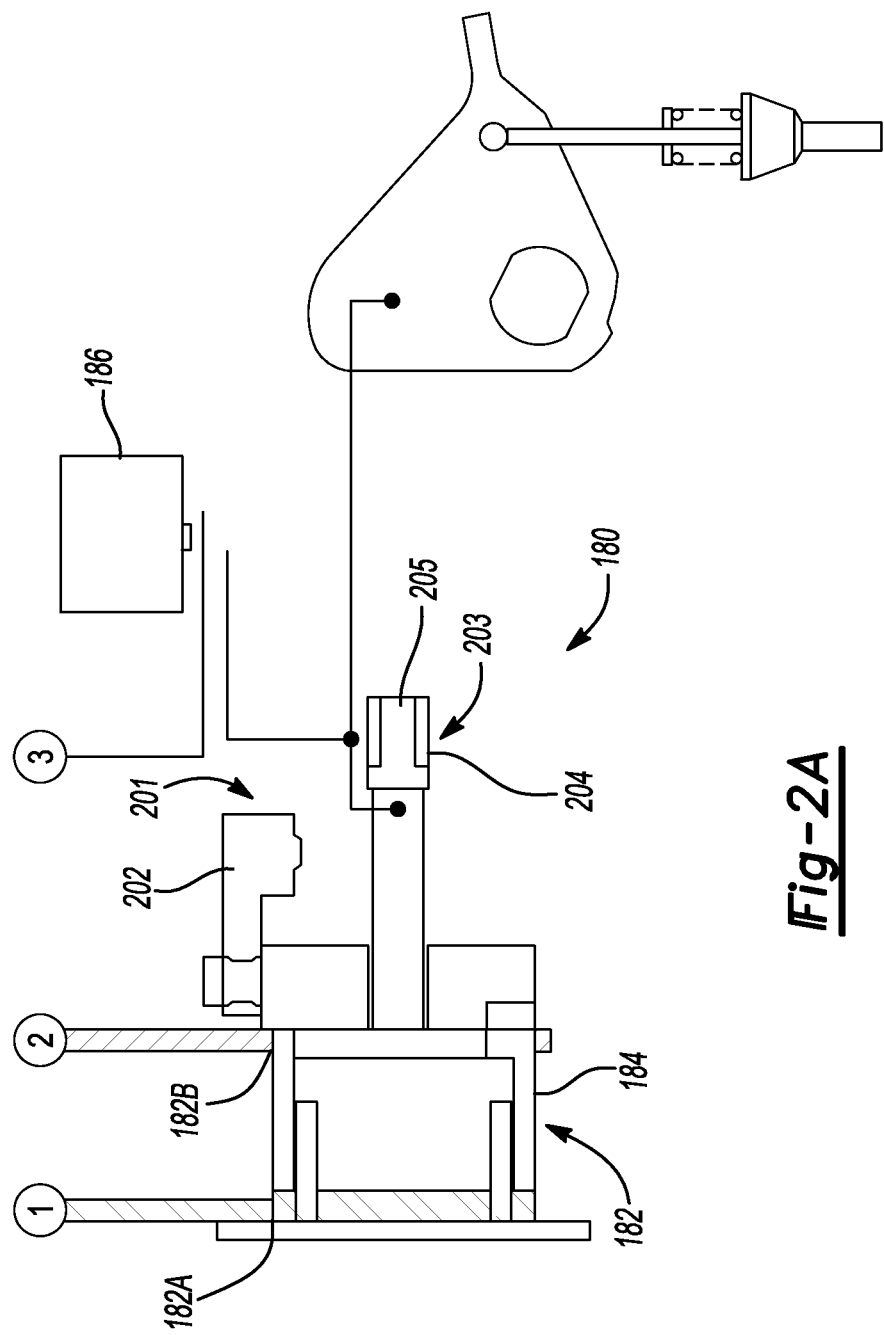
FIG. 2A is a diagram of a portion of another hydraulic control system according to the principles of the present disclosure.
Figure 2B:
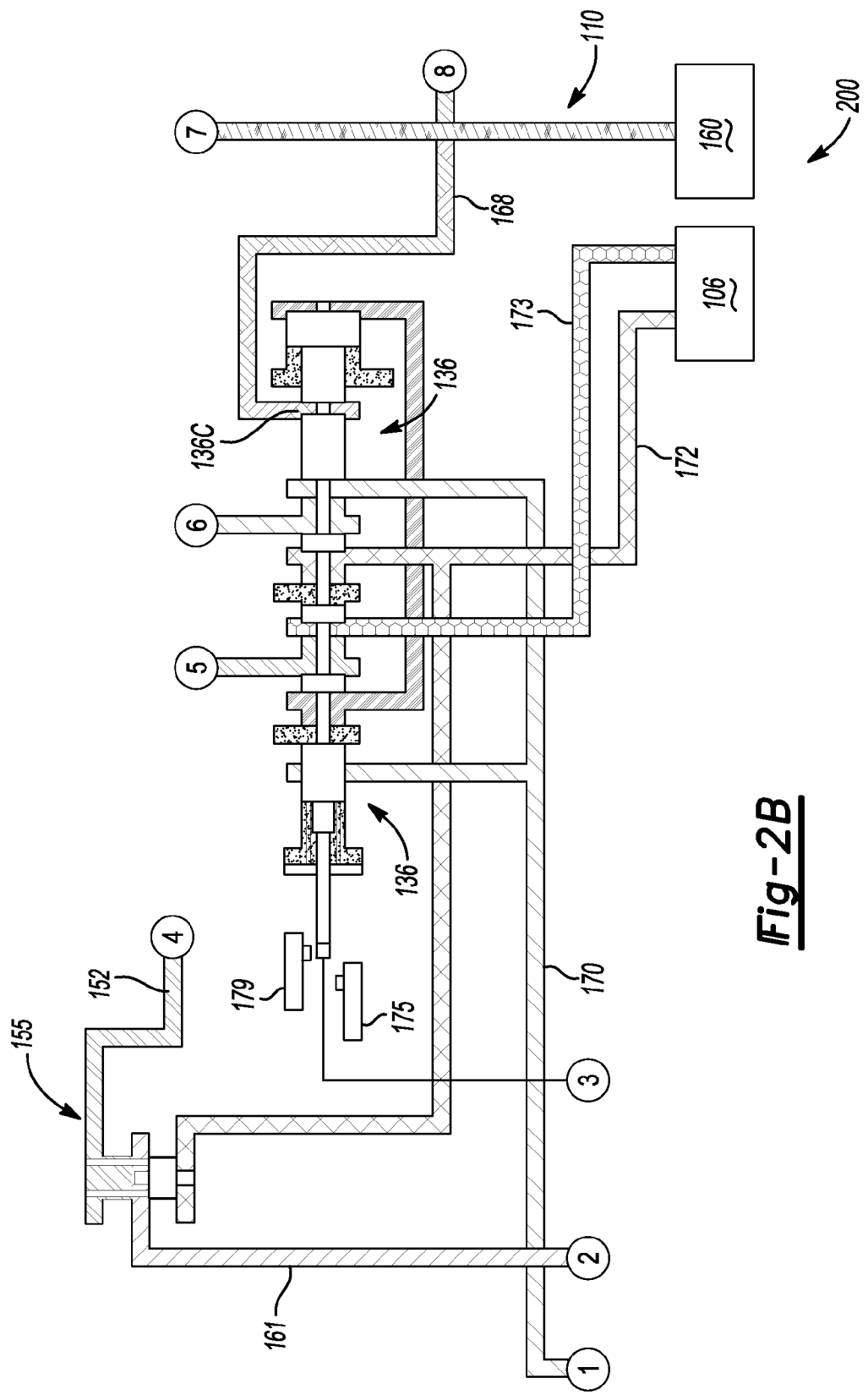
FIG. 2B is a diagram of another portion of the hydraulic control system of FIG. 2A, according to the principles of the present disclosure.
Figure 2C:
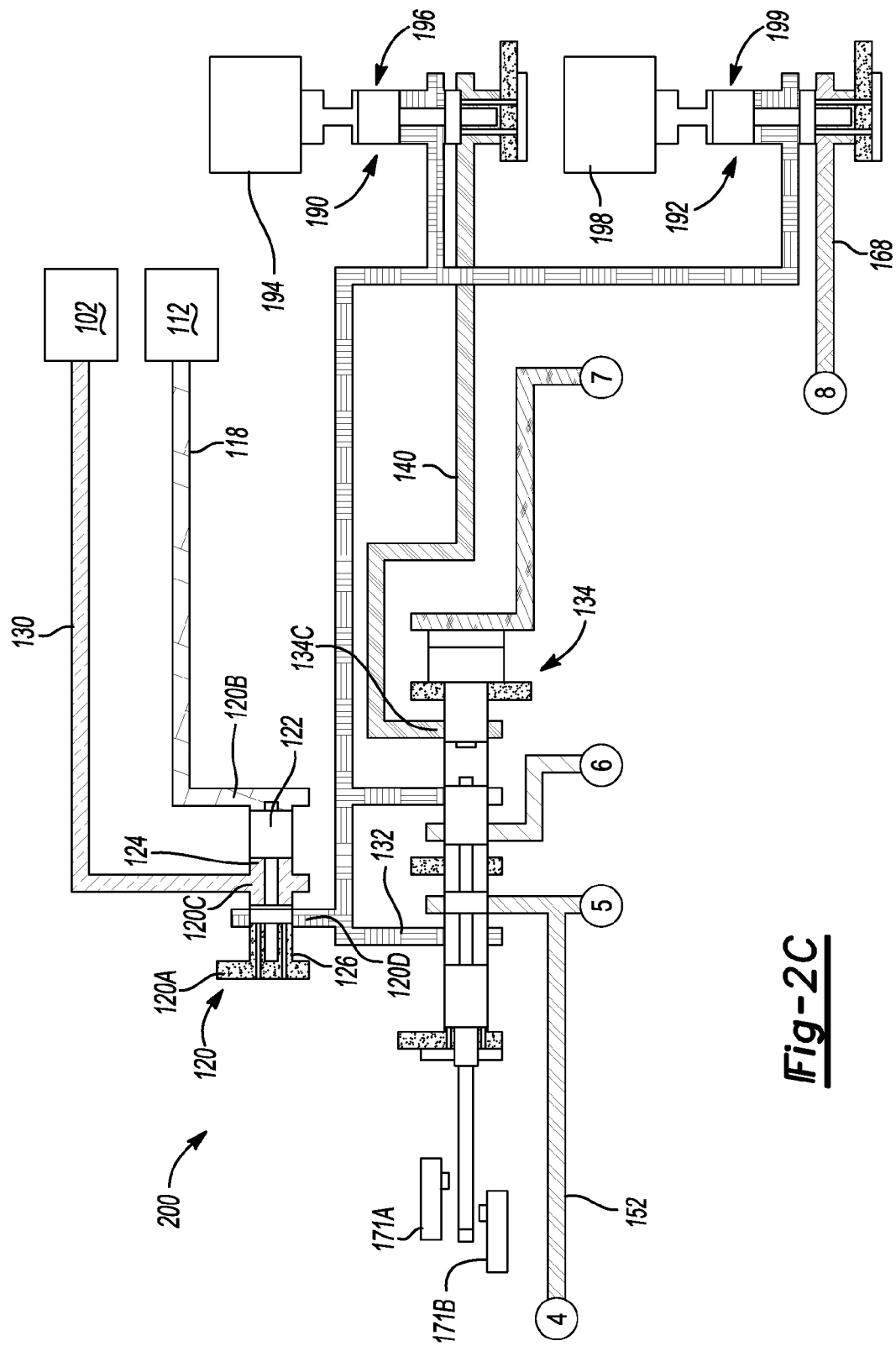
FIG. 2C is a diagram of yet another portion of the hydraulic control system of FIGS. 2A-2C, in accordance with the principles of the present disclosure.

Turning to FIG. 2, another embodiment of the hydraulic control system is generally indicated by reference number 200. The hydraulic control system 200 is similar to the hydraulic control system 100 shown in FIGS. 1-1A and like components are indicated by like reference numbers. The first and second mode valves 134, 136 are the same as those described and shown with respect to FIGS. 1-1A, and every port and line is not label specifically labeled, but should be understood to be the same as in FIGS. 1-1A. However, the solenoid 114 and the solenoid 116 have been replaced by solenoid-valve assemblies 190, 192. The solenoid-valve assembly 190 includes a low flow solenoid 194 that controls a valve 196. The solenoid 194 actuates the valve 196, which supplies fluid pressure to the port 134C through the line 140. The solenoid-valve assembly 192 includes a low flow solenoid 198 that controls a valve 199. The solenoid 198 actuates the valve 199, which supplies fluid pressure to the port 136C through the line 168. The first mode valve 134 also includes a pair of positions sensors 171A, 171B, in this embodiment.

Figure 3A:
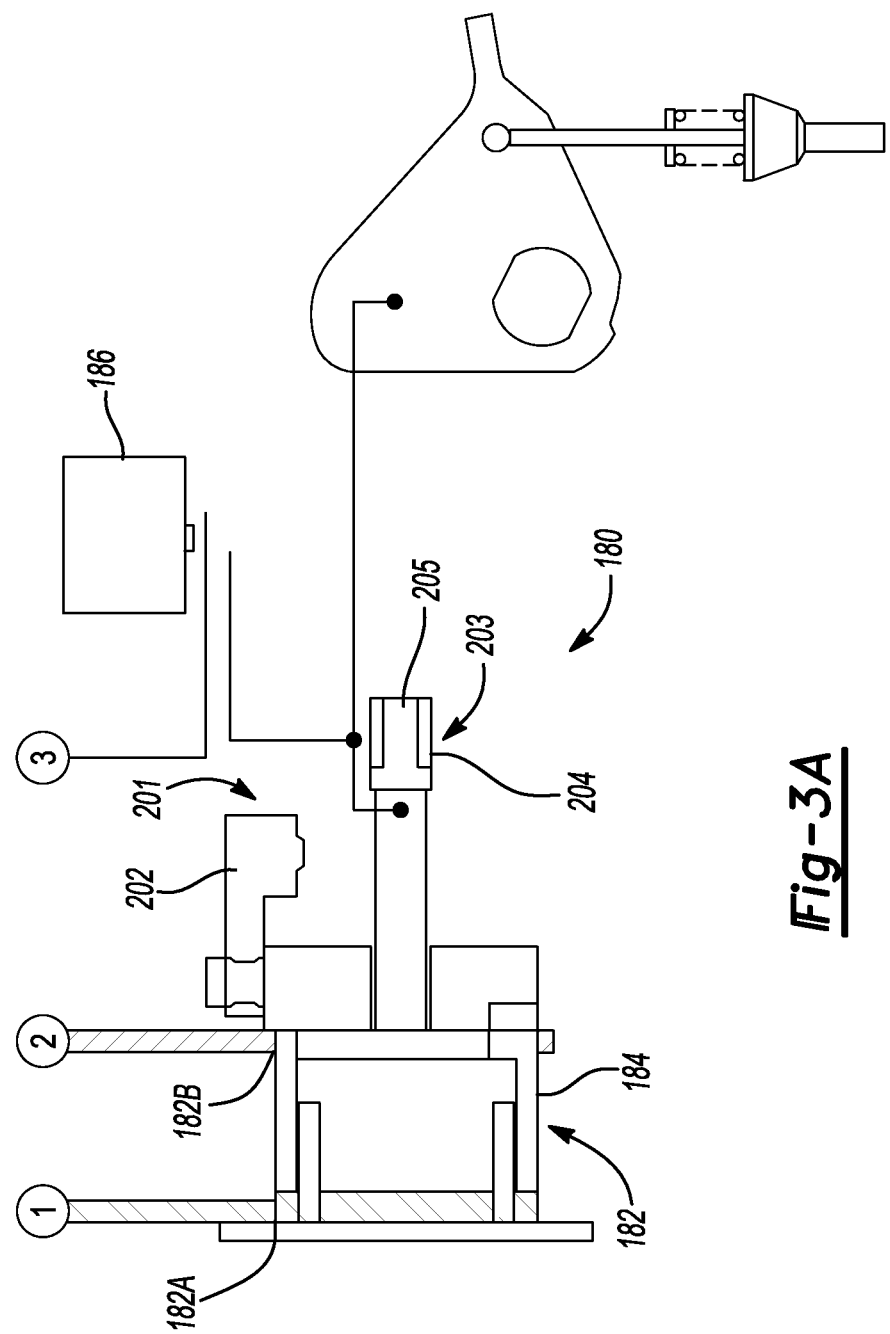
FIG. 3A is a diagram of a portion of yet another hydraulic control system according to the principles of the present disclosure.
Figure 3B:
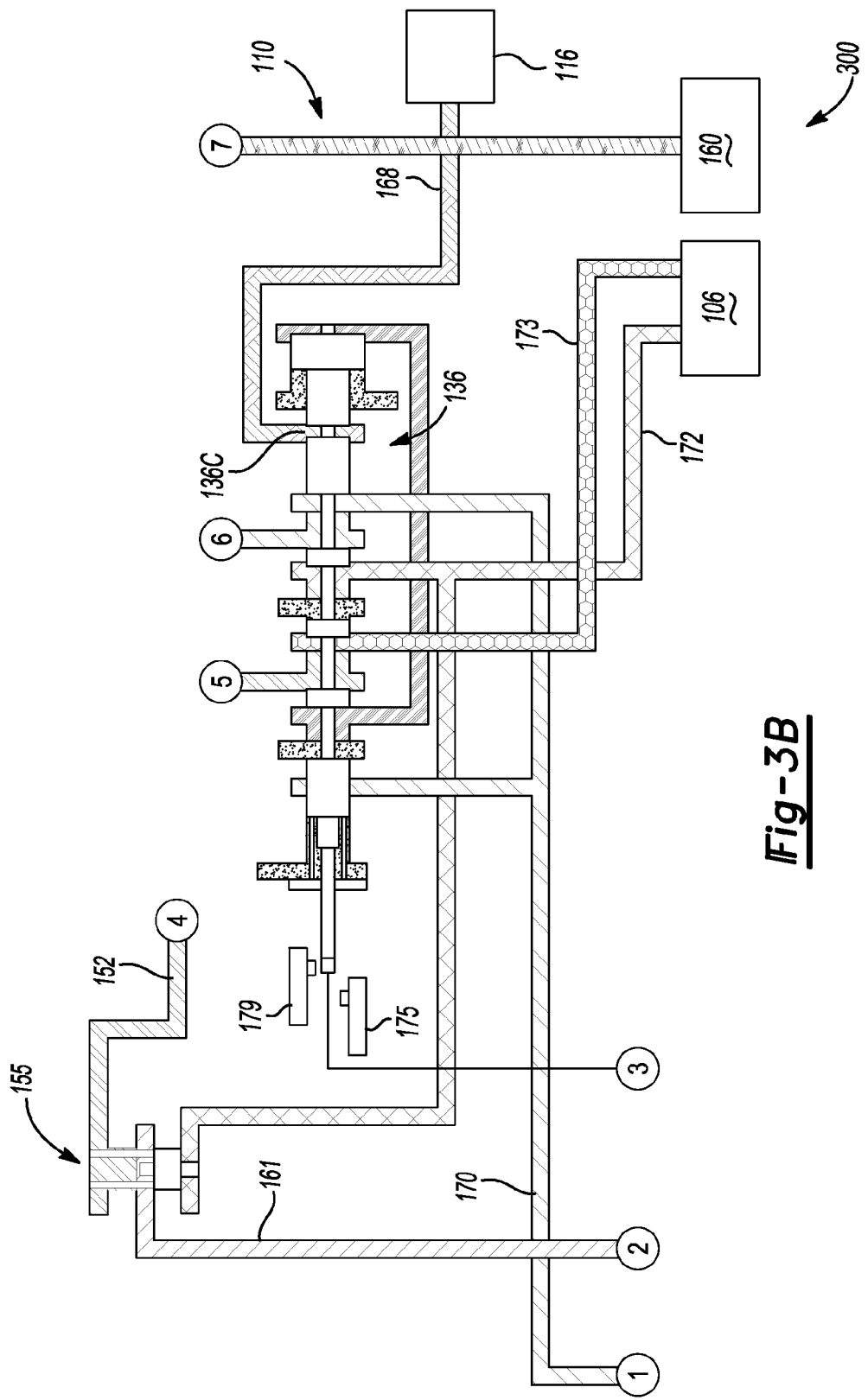
FIG. 3B is a diagram of another portion of the hydraulic control system of FIG. 3A, in accordance with the principles of the present disclosure.
Figure 3C:
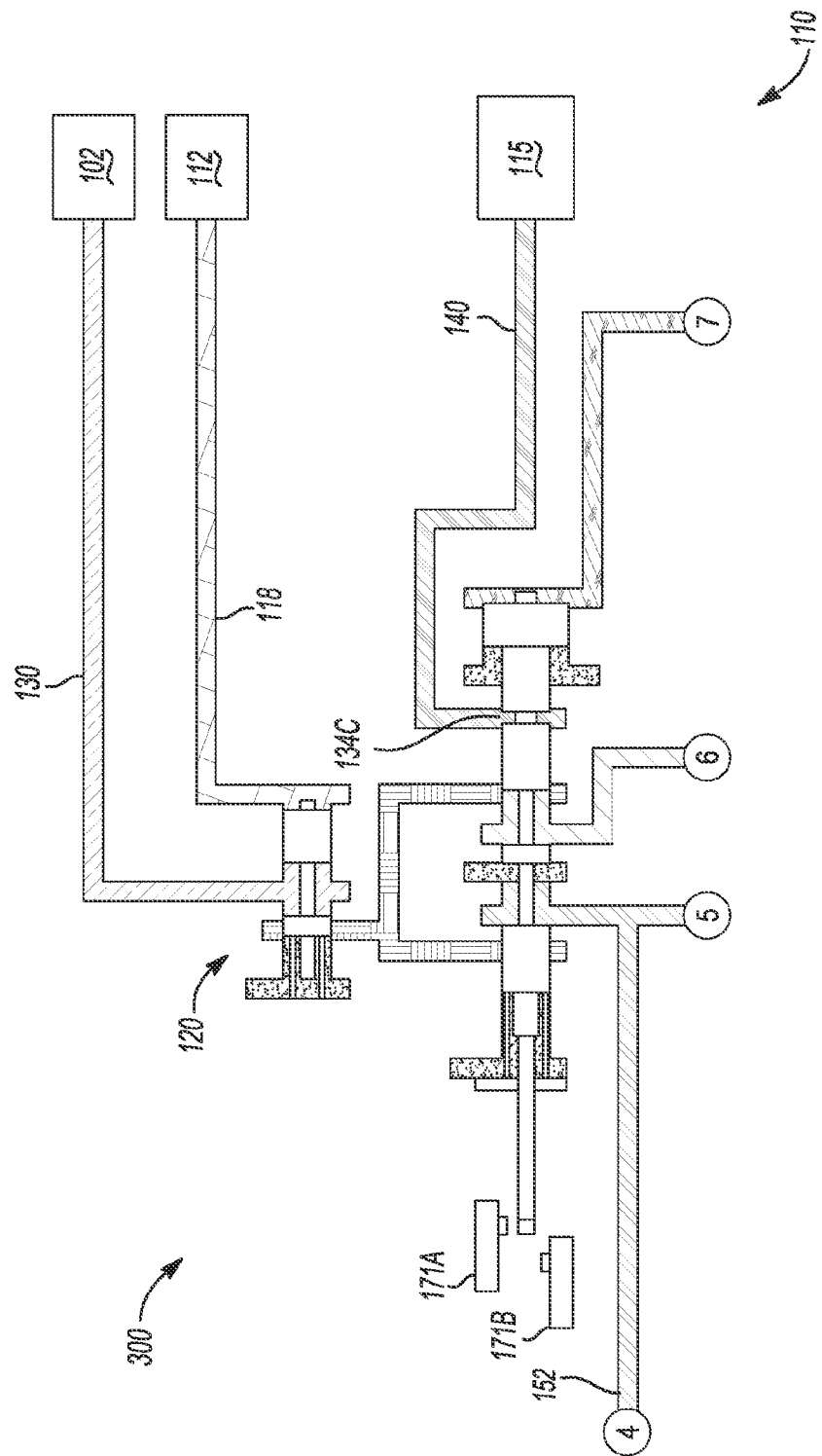
FIG. 3C is a diagram of yet another portion of the hydraulic control system of FIGS. 3A-3B, according to the principles of the present disclosure.

With reference to FIG. 3, yet another embodiment of the hydraulic control system is generally indicated by reference number 300. The hydraulic control system 300 is similar to the hydraulic control system 100 shown in FIGS. 1-1A and like components are indicated by like reference numbers. The first and second mode valves 134, 136 and the valve assembly 120 are the same as those described and shown with respect to FIGS. 1-1A, and every port and line is not label specifically labeled, but should be understood to be the same as in FIGS. 1-1A. However, the solenoid 114 has been replaced by a dedicated high flow solenoid 115. Whereas the solenoid 114 could have been a solenoid that was used with other components, the high flow solenoid 115 is a dedicated solenoid for actuating the second mode valve assembly 134. The first mode valve 134 also includes a pair of positions sensors 171A, 171B, in this embodiment.

Figure 4B:
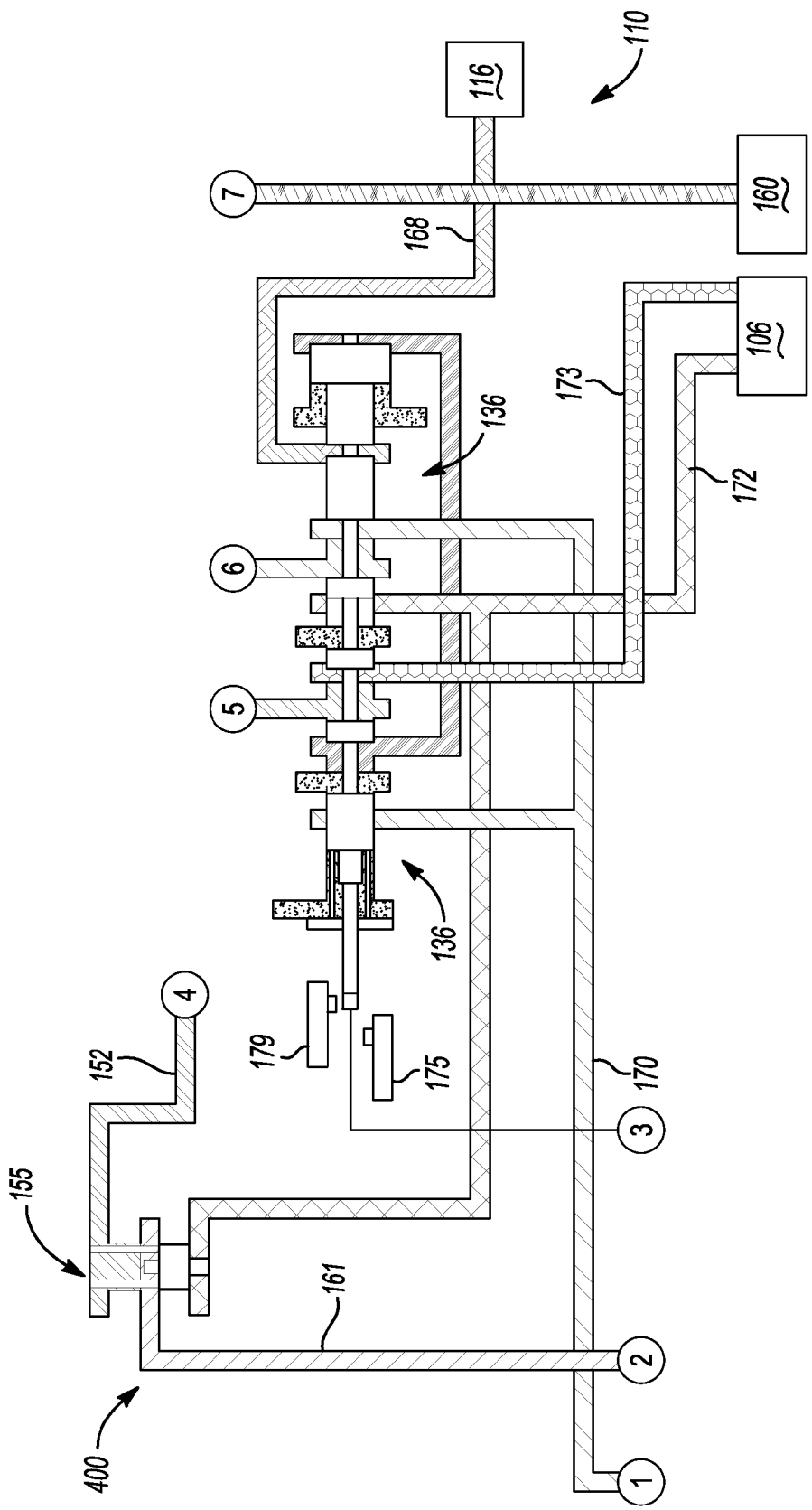
FIG. 4B is a diagram of another portion of the hydraulic control system of FIG. 4A, according to the principles of the present disclosure.
Figure 4C:
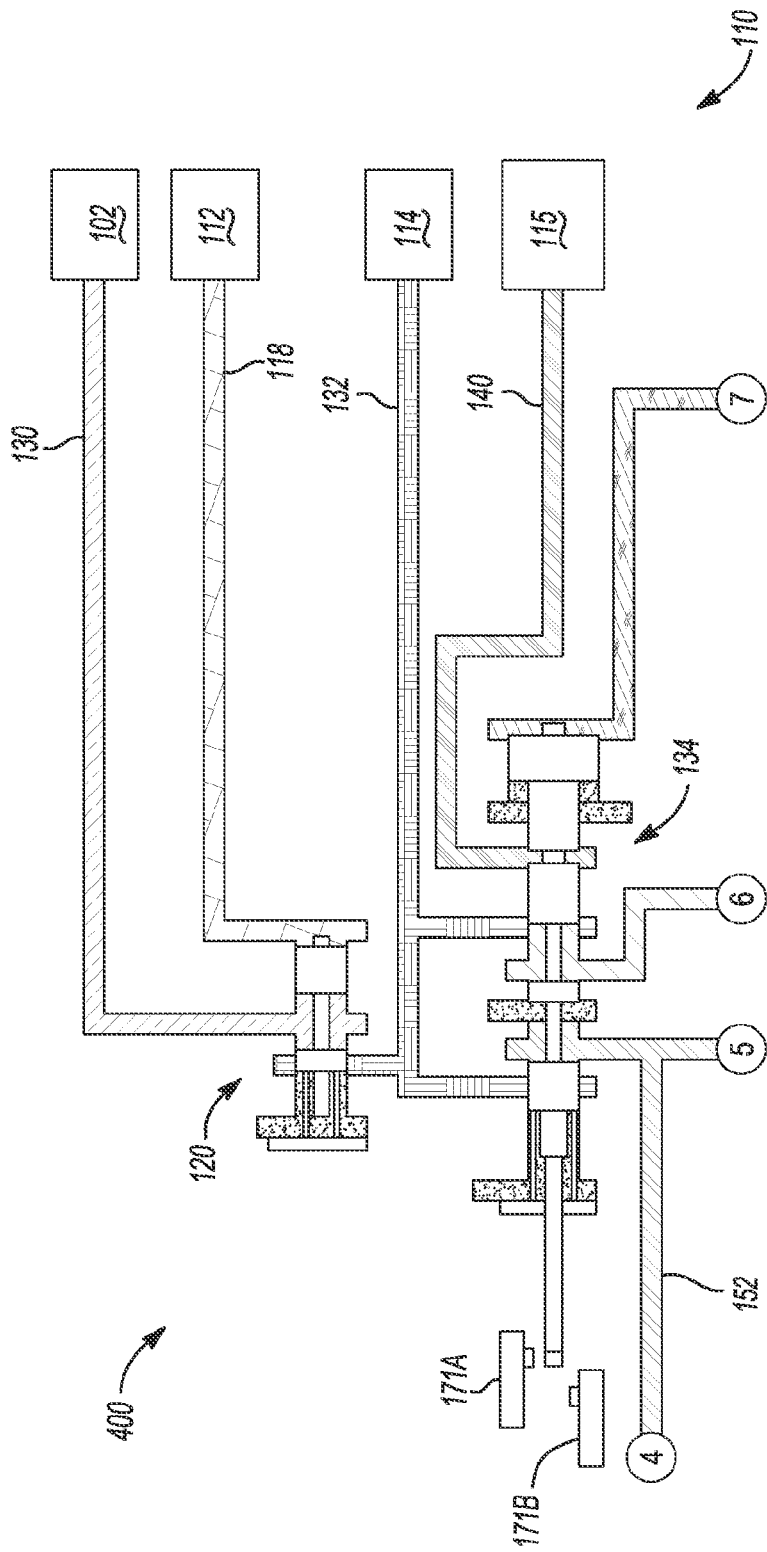
FIG. 4C is a diagram of yet another portion of the hydraulic control system of FIGS. 4A-4B, in accordance with the principles of the present disclosure.

With reference to FIG. 4, still another embodiment of the hydraulic control system is generally indicated by reference number 400. The hydraulic control system 400 is similar to the hydraulic control system 100 shown in FIGS. 1-1A and like components are indicated by like reference numbers. The first and second mode valves 134, 136 and the valve assembly 120 are the same as those described and shown with respect to FIGS. 1-1A, and every port, line, or other component is not specifically labeled, but should be understood to be the same as in FIGS. 1-1A. However, the first mode valve 134 includes a pair of positions sensors 171A, 171B, in this embodiment, rather than a single position sensor 171.

Referring now to FIGS. 5A-5C, the park mechanism 180 and park sensor assembly 201 are illustrated in greater detail. The park piston 184 is connected to a piston rod 207, which has the park sensor assembly 201 disposed at an end 208 thereof. The Hall Effect sensor switch 202 is connected to a stationary piston housing 209 of the piston 184 by a fastener 210 and compression limiter 211. A park lever 212 is pivotally attached to the piston rod 207 and to an actuator rod assembly 213, which is configured to move the transmission into and out of park. Thus, the piston rod 207 is coupled to the actuator rod assembly 213 through the park lever 212. The magnet assembly 203 includes the magnet 204 disposed around the holder 205 (preferably formed of plastic), and the magnet assembly 203 is secured to the end 208 of the piston rod 207, such that the magnet assembly 203 moves axially with movement of the piston rod 207. For example, the magnet assembly 203 may be assembled to or molded over the end 208 of the piston rod 207.

As shown in FIG. 5B, when the transmission is in park, the end 208 of the piston rod 207, having the magnet assembly 203 disposed thereon, aligns with the Hall Effect sensor switch 202, such that the Hall Effect recognized the magnet 204 and that the transmission is in park. When the piston rod 207 is moved further away from the piston housing 209 along its longitudinal axis, as shown in FIG. 5C, the end 208 of the piston rod 207 and the magnet assembly 203 are no longer aligned with the Hall Effect sensor switch 202. Thus, the Hall Effect sensor switch 202 does not recognize the magnet 204, which indicates that the transmission is not in park.

The description of the invention is merely exemplary in nature and variations that do not depart from the general essence of the invention are intended to be within the scope of the invention. Such variations are not to be regarded as a departure from the spirit and scope of the invention.

What is claimed is:

1. A hydraulic control system for a transmission, the transmission having a Park mode and an Out of Park mode of operation, the transmission having a plurality of torque transmitting devices selectively engageable to provide at least one forward speed ratio and at least one reverse speed ratio when in the Out of Park mode of operation, the hydraulic control system comprising:

a pressure regulator subsystem for providing a pressurized hydraulic fluid;

a first mode valve assembly having first and second ports in communication with the pressure regulator subsystem, and third and fourth ports, the first mode valve assembly having a first mode valve moveable between a first and a second position;

a second mode valve assembly having a first port in communication with the third port of the first mode valve assembly and a second port in communication with the fourth port of the first mode valve assembly, the second mode valve assembly having a third port in communication with a Drive circuit, a fourth port in communication with a Reverse circuit, and a fifth port, the second mode valve assembly having a second mode valve moveable between a first and a second position;

a park feed valve assembly having a first port in communication with the third port of the first mode valve assembly, the park feed valve assembly having a second port in communication with a Park circuit, the park feed valve assembly having a park feed valve moveable between a Park position and an Out of Park position;

a park mechanism having a first port in communication with the second port of the park feed valve assembly and a second port in communication with the fifth port of the second mode valve assembly, the park mechanism being configured to place the transmission in the Park mode and the Out of Park mode, and a park lock control device connected to the park mechanism, wherein the park lock control device is actuatable to mechanically prevent the park mechanism from placing the transmission in a Park condition during an engine stop-start event; and wherein the first port of the first mode valve assembly is in communication with the third port of the first mode valve assembly when the first mode valve is in the first position, and wherein the second port of the first mode valve assembly is in communication with the fourth port of the first mode valve assembly when the first mode valve is in the second position.

2. The hydraulic control system of claim 1, wherein the first port of the second mode valve assembly is in communication with the third port of the second mode valve assembly when the second mode valve is in the first position, the second port of the second mode valve assembly being in communication with the fifth port of the second mode valve assembly when the second mode valve is in the first position, and wherein the second port of the first mode valve assembly is in communication with the fourth port of the second mode valve assembly when the second mode valve is in the second position.

3. The hydraulic control system of claim 2, further comprising an enablement valve assembly having a first port in communication with the pressure regulator subsystem and a second portion in communication with the first and second ports of the first mode valve assembly.

4. The hydraulic control system of claim 3, further comprising a first control device in upstream fluid communication with the second mode valve assembly, wherein the first control device when opened communicates pressurized hydraulic fluid to a sixth port of the second mode valve assembly to move the second mode valve from the first position to the second position.

5. The hydraulic control system of claim 4, further comprising a second control device in upstream fluid communication with the first mode valve assembly, wherein the second control device when opened communicates pressurized hydraulic fluid to a fifth port of the first mode valve assembly to move the first mode valve from the first position to the second position.

6. The hydraulic control system of claim 5, further comprising a park sensor assembly connected to the park mechanism, the park sensor assembly being configured to sense the position of the park mechanism, the park sensor assembly including a Hall Effect sensor switch and a magnet assembly.

7. The hydraulic control system of claim 6, the park mechanism having an axially movable piston rod, the magnet assembly being connected to the piston rod, the piston rod and the magnet assembly being movable with respect to the Hall Effect sensor switch.

8. A hydraulic control system for a transmission, the transmission having a Park mode and an Out of Park mode of operation, the transmission having a plurality of torque transmitting devices selectively engageable to provide at least one forward speed ratio and at least one reverse speed ratio when in the Out of Park mode of operation, the hydraulic control system comprising:

a pressure regulator subsystem for providing a pressurized hydraulic fluid;

a first mode valve assembly in downstream fluid communication with the pressure regulator subsystem;

a second mode valve assembly in downstream fluid communication with the first mode valve assembly;

a clutch control subsystem for selectively actuating the torque transmitting devices upon receipt of the pressurized hydraulic fluid, and wherein the clutch control subsystem is in downstream fluid communication with the second mode valve assembly;

a park feed valve assembly in downstream fluid communication with the first mode valve assembly and the second mode valve assembly, the park feed valve assembly having a park feed valve moveable between a Park position and an Out of Park position;

a park mechanism in downstream fluid communication with the park feed valve assembly and the second mode valve assembly, and wherein the park mechanism includes an actuator rod assembly, a piston rod, a magnet assembly, and a sensor assembly, the actuator rod assembly is configured to move the transmission into and out of the park, the piston rod is coupled to the actuator rod assembly and configured to move along an axis between the park position and the out of park position, the magnet assembly is fixed to the piston rod, the sensor assembly is disposed adjacent to the magnet assembly, the magnet assembly and piston rod are movable with respect to the sensor assembly, the sensor assembly is operable to detect the magnet assembly when the piston rod is in the park position; and a park lock control device connected to the park mechanism, wherein the park lock control device is actuatable to mechanically prevent the park mechanism from placing the transmission in the Park mode during an engine stop-start event.

* * * * *